United States Patent [15] 3,696,943
Mulford [45] Oct. 10, 1972

[54] FRUIT SUPPORTING APPARATUS

[72] Inventor: Charles T. Mulford, Auburndale, Fla.

[73] Assignee: FMC Corporation, San Jose, Calif.

[22] Filed: April 1, 1971

[21] Appl. No.: 130,122

[52] U.S. Cl. .....................214/1 BC, 269/53, 294/61
[51] Int. Cl. ..............................................B23q 3/18
[58] Field of Search ..........214/1 BC; 294/61; 269/53

[56] References Cited

UNITED STATES PATENTS 3,031,067 4/1962 Polk .........................198/209
3,259,253 7/1966 Grotewold...............294/61 X Primary Examiner—Gerald M. Forlenza
Assistant Examiner—George F. Abraham
Attorney—F. W. Anderson, C. E. Tripp and R. S. Kelly

[57] ABSTRACT

A fruit is arranged to be held upon a plurality of impaling pins with its top surface at a predetermined elevation regardless of the size of the fruit by means of a support for the lowermost surface of the fruit which support is slidably mounted with respect to the pins and is hydraulically controlled. Valve means are provided to permit the support to move vertically with the fruit when the fruit is placed in the proper position upon the pins and to prevent further movement of the support during subsequent processing operations performed upon the fruit.

11 Claims, 6 Drawing Figures

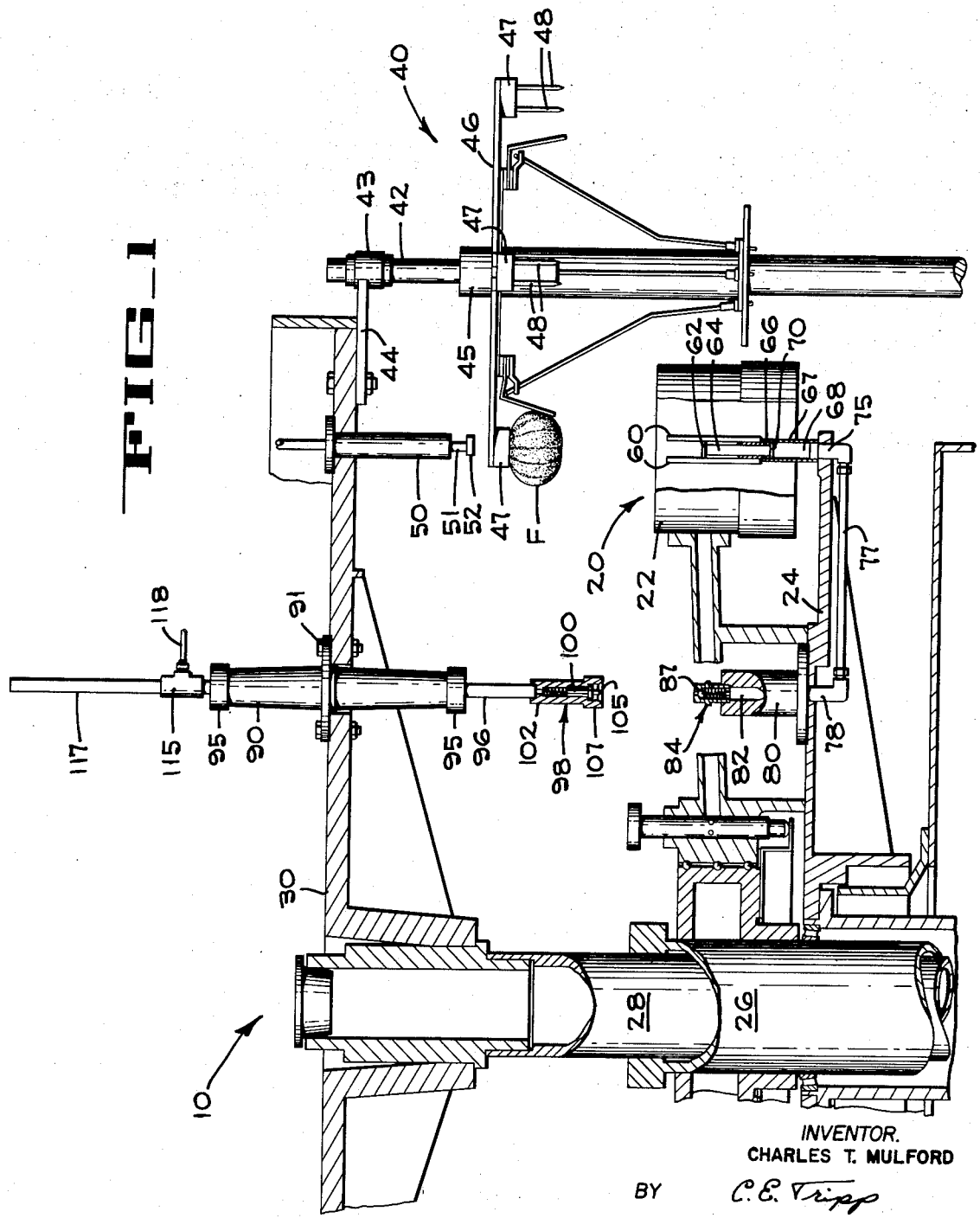

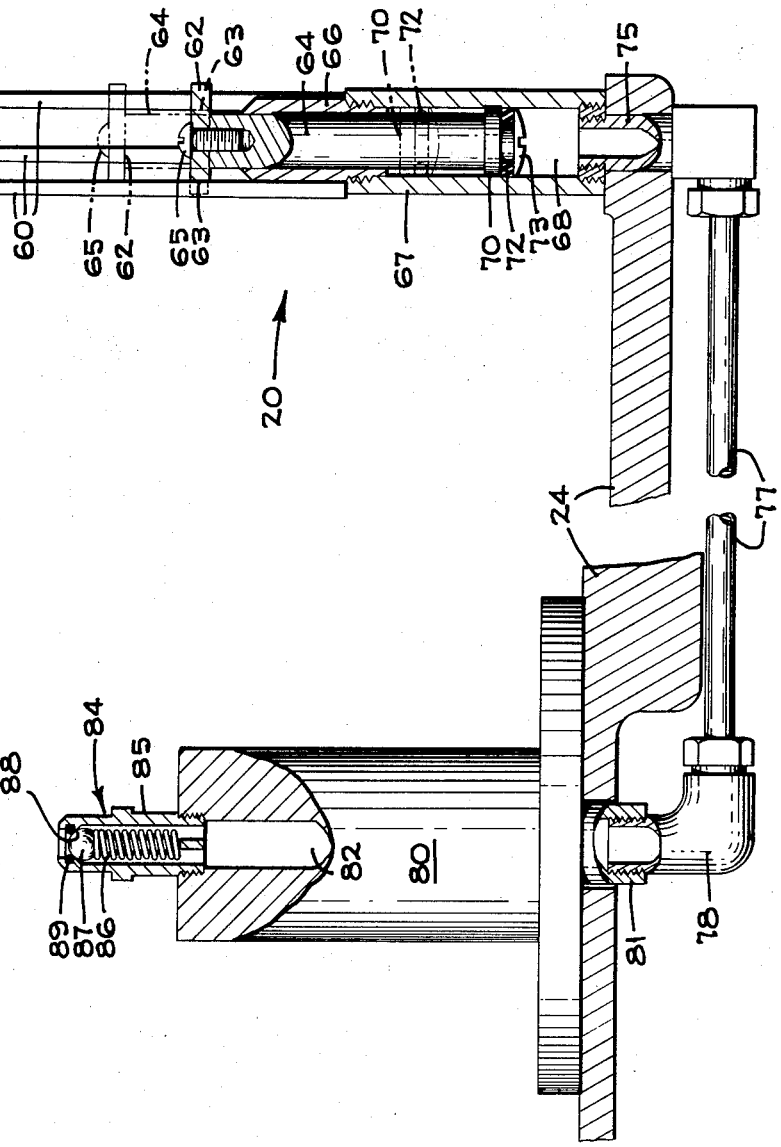

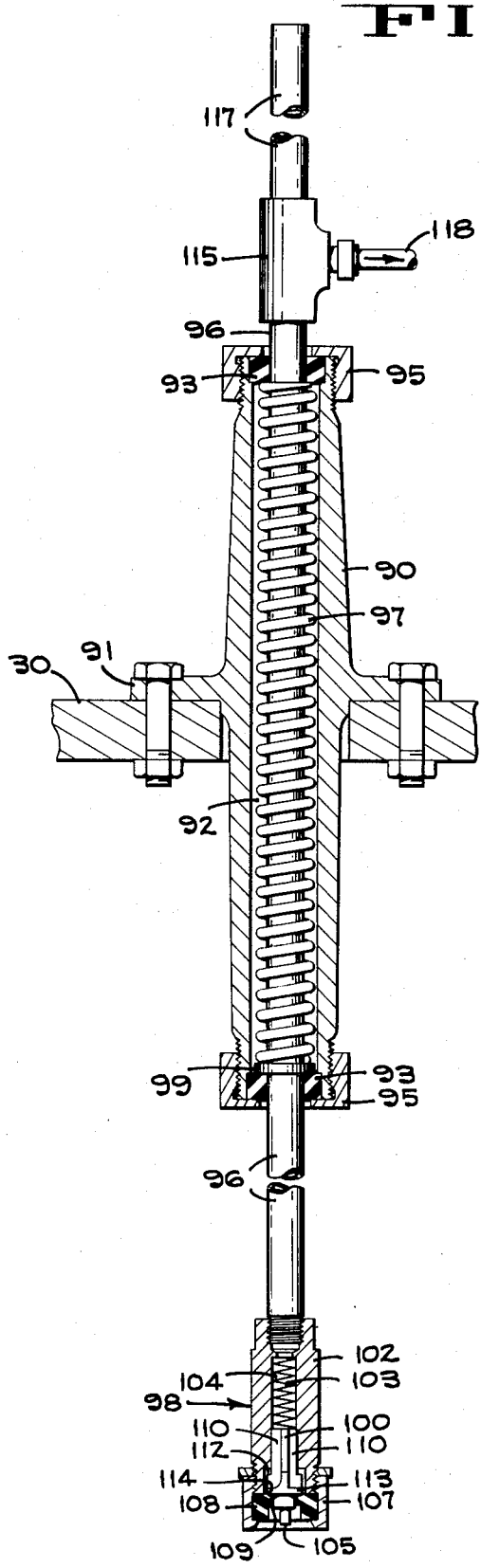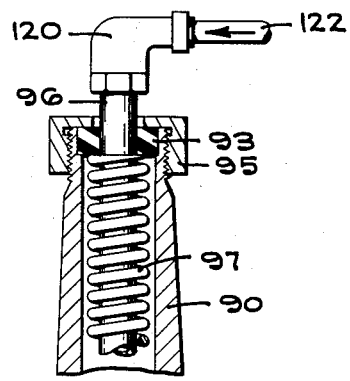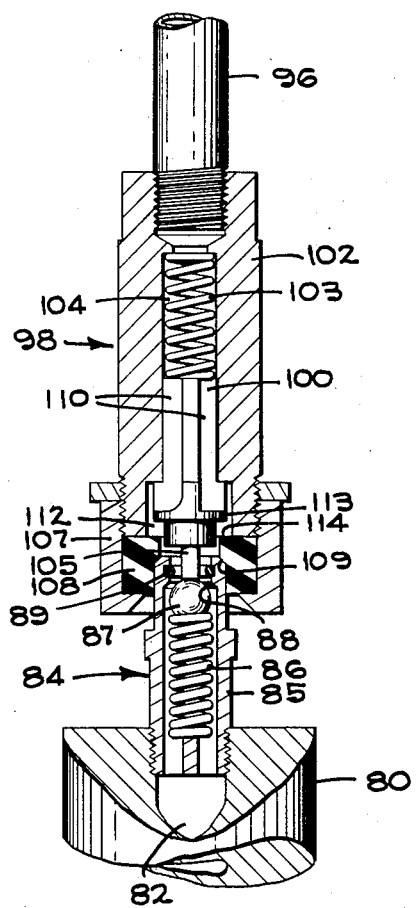

FRUIT SUPPORTING APPARATUS

BACKGROUND OF THE INVENTION

1. Field of the Invention

The present invention pertains to apparatus for processing fruit, and more particularly, it pertains to apparatus for successively locating fruit with their top surfaces at a predetermined elevation regardless of relative size differences in the fruit.

2. Description of the Prior Art

In the processing of fruit wherein certain mechanical operations such as those involving penetration of the fruit by blades or the like are to be performed, it is oftentimes necessary to position the fruit in a particular orientation with one surface thereof being particularly located with regard to the penetrating blades so that the desired operations will be carried out properly. Since fruit will vary in size and shape, special orienting and locating devices are usually provided in order to accommodate the size ranges of the fruit to be handled. For example, U.S. Pat. No. 3,275,052 To Wilber C. Belk discloses a citrus fruit sectionizing machine which is provided with a means for dividing peeled citrus fruit, such as grapefruit, into individual segments which machine requires that each whole fruit be oriented with its axis in a vertical position and with its top surface at a particular elevation so that the sectionizing blades can be inserted into the fruit without engaging the seeds in order to assure a proper severing of the membranes that hold the fruit segments together.

Apparatus for accomplishing the placing of successive fruit at a particular elevation for subsequent processing in a citrus fruit sectionizing machine is shown in U.S. Pat. No. 3,031,067 to Ralph Polk, Jr. In the apparatus disclosed in this patent, a peeled grapefruit is arranged to be placed upon a support member which is slidably mounted upon a plurality of upright impaling prongs with the prongs being arranged to surround the axis of the fruit in parallel relationship thereto. The support member is mounted for vertical travel and is biased upwardly by a compression spring. A locking device is normally spring-urged inwardly to lock the support member at the particular desired elevation, and camming means are provided to cam the locking device outwardly to permit vertical movement of the support member during the transfer of the fruit thereto. When a fruit is placed upon the support member the locking device is cammed outwardly so that the fruit can be pushed downwardly until its uppermost surface is at the proper predetermined elevation. When the fruit reaches this desired position, the camming means is released to permit the spring-urged locking device to move into tight gripping engagement with the support member and thereby lock it in said desired position. After the sectionizing operations have been performed upon the fruit and the individual fruit segments have been discharged, the locking device is again cammed outwardly so as to release the support member and thereby allow it to be returned by the compression spring to its uppermost position ready to accommodate a new whole citrus fruit.

While the foregoing device disclosed in U.S. Pat. No. 3,031,067 has proven to be highly successful, it is noted that a considerable number of relatively movable mechanical elements are required in order to permit the yieldable fruit support member to be positioned at the proper elevation and to lock it at such elevation. The number of elements, many of which must be machined to fairly close tolerances, has made such a fruit supporting device costly to manufacture. Furthermore, mechanical elements which move relative to each other are subject to wear, and it has proven to be time consuming and costly to repair and/or replace elements in the aforedescribed fruit supporting device which have become worn after repeated usage.

SUMMARY OF THE INVENTION

The fruit supporting apparatus of the present invention is specifically designed for use in a citrus fruit sectionizing machine such as the machine disclosed in the aforementioned U.S. Pat. No. 3,275,052 to Belk. Furthermore, the apparatus of the present invention is specifically designed to replace the aforementioned fruit supporting apparatus disclosed in the prior U.S. Pat. No. 3,031,067 to Polk.

The fruit supporting apparatus of the present inventions generally comprises a vertically yieldable fruit support platform which is slidably mounted upon a plurality of impaling prongs arranged to receive the fruit which is moved downwardly thereon. Hydraulic means are utilized to both support the platform and to lock it in the desired position so that the uppermost surface of the fruit will be located at the correct elevation. In order to accomplish this, the support platform is provided with an elongated support spindle the distal end of which comprises a piston operating within a fluid chamber. By controlling the discharge of fluid from the chamber, the position of the spindle, and hence the support platform, can be accurately and positively controlled. Such control apparatus in the present invention generally comprises a vertically movable valve actuating member which operates against a ball check valve member to allow fluid to be released from said chamber and also to allow fluid to be injected into said chamber when it is desired to re-set the fruit support platform.

With the apparatus of the present invention, a simple and dependable fruit support mechanism is provided which includes very few mechanically moving parts other than the conventional check valve structure and the slidable spindle and piston assembly which carry the fruit support platform. It is particularly to be noted that a complex spring and lever locking device, such as was required by the prior art apparatus, is no longer necessary. Problems of excess wear due to repeated usage of relatively moving mechanical parts are not presented, and it is believed that the apparatus of the present invention will have an almost indefinite period of life except for the occasional replacement of the fluid seal elements. Furthermore, a supported fruit will not tend to slip or move slightly from its predetermined position since the hydraulic lock will prevent even the slightest movement thereof; thus, the apparatus of the present invention provides a more positive and dependable means for supporting a fruit than that previously available which improved support means will not tend to become unreliable as parts thereof become worn.

BRIEF DESCRIPTION OF THE DRAWINGS

FIG. 1 is a vertical section through a portion of a citrus fruit sectionizing machine which incorporates the fruit supporting apparatus of the present invention.

FIG. 2 is an enlarged fragmentary section showing the fruit supporting apparatus of the present invention.

FIG. 3 is an isometric view of a portion of the fruit supporting apparatus shown in FIG. 2.

FIG. 4 is an enlarged vertical section through a portion of the hydraulic control means for the fruit supporting apparatus shown in FIG. 1.

FIG. 5 is an enlarged fragmentary section showing the hydraulic control means of FIG. 4 in engagement with the hydraulic circuitry of the fruit supporting apparatus of FIG. 2.

FIG. 6 is a fragmentary section showing a portion of the hydraulic control means for re-setting the fruit supporting apparatus of the present invention.

DESCRIPTION OF THE PREFERRED EMBODIMENT

The fruit supporting apparatus 20 of the present invention is particularly designed for use with a citrus fruit sectionizing machine 10, a portion of which is shown in FIG. 1 of the drawings, although it will be recognized that the fruit supporting apparatus has utility in other fruit processing machines which have similar requirements for positioning a fruit in a particular orientation and locating it at a particular elevation so that processing operations may be carried out thereon. The particular citrus fruit sectionizing machine which is designed to accommodate the fruit supporting apparatus of the present invention is disclosed in the aforementioned U.S. Pat. No. 3,275,052 to Belk, and reference may be had to this patent for a disclosure of the structure and operation of the various portions of said sectionizing machine which permit the fruit supporting apparatus of the present invention to function.

The citrus fruit sectionizing machine, as shown in FIG. 1, generally comprises a plurality of circumferentially arranged, inflatable fruit carriers 22 (one only being shown) for gripping and supporting the sides of a fruit while the lowermost surface thereof is received upon the fruit supporting apparatus 20. Each of the fruit carriers 22 are mounted at the outer ends of radially extending supporting arms 24 that are attached at their inner ends to a tubular post 26. The post is mounted for rotation and is adapted to be intermittently driven in angular increments of thirty degrees, the drive structure for such post and its mode of operation being fully described in the aforementioned U.S. Pat. No. 3,275,052. Mounted for relative reciprocal movement within the tubular post 26 is a second post 28 which is non-rotatable but which is arranged to be moved intermittently with a vertical reciprocating motion by means also described in the aforementioned U.S. Pat. No. 3,275,052. Post 28 supports at its uppermost end a generally flat tool carrier plate 30 which is adapted to carry the various processing apparatus adapted to perform operations upon the fruit carried within each of the fruit carriers 22.

To briefly summarize the operation of the citrus fruit sectionizing machine thus far described, a peeled citrus fruit is delevered to one of the fruit carriers 22 and then is indexed in thirty degree incremental movements about the axis of the tubular posts 26 and 28 so as to successively bring each citrus fruit beneath a plurality of angularly spaced fruit processing equipment which depend from the overlying plate 30 and which are brought into engagement with the fruit when the plate is lowered while the fruit carriers are at rest. After such equipment has performed the segmentizing operations upon the fruit and the fruit has been discharged from the carrier, the empty carrier will be in a position to again receive a new whole citrus fruit.

The apparatus for delivering the citrus fruit to the fruit carriers is shown at the right hand side of FIG. 1 and will be seen to comprise a fruit transfer mechanism 40 which is described in detail in U.S. Pat. No. 3,030,990 to Ralph Polk, Jr. to which reference may be had for a further description of the structure and operation of such transfer mechanism. Generally, the transfer mechanism comprises a rotatable mounting post 42 the upper end of which is rotatably journalled in a bearing 43 so that is welded or otherwise rigidly attached to a bracket 44 which is bolted to the peripheral edge of the tool carriage plate 30. Post 42 includes an enlarged hub 45 which supports at its uppermost end a prong carrier plate 46 that is provided with generally horseshoe shaped ring members 47 angularly spaced ninety degrees apart about the periphery of the plate with each of the ring members being provided with a pair of spaced prongs 48 extending downwardly therefrom. A previously oriented fruit, i.e., a fruit oriented with its axis aligned in the vertical direction and located in the correct position with respect to the prongs, is positioned upon the depending prongs at the right hand side (FIG. 1) of the transfer mechanism. This fruit is then indexed as the post 42 is rotated by intermittent ninety degree movements (by means fully disclosed in the aforementioned U.S. Pat. No 3,030,990) until it reaches the position at the left hand side of the transfer mechanism wherein it will be received directly above the fruit supporting apparatus 20 of the present invention which position of a fruit F is illustrated in FIG. 1. With the fruit supporting apparatus and the surrounding fruit carrier 22 in a temporary stationary position, the central post 28 and its supported tool carrier plate 30 are moved downwardly. Since the mounting post 42 of the transfer mechanism 40 is secured to the tool carrier plate through the bracket 44, the fruit F will be lowered also until it is received upon the fruit supporting apparatus with its uppermost surface, as determined by the lower face of the ring member 47, being located at the correct elevation when the tool carrier plate reaches the lower limit of its vertical reciprocatory movement. Located upon the tool carrier plate directly above the ring member 47 at the left hand side (FIG. 1) of the fruit transfer mechanism is a downwardly projecting guide tube 50 which slidably mounts a rod 51 that extends therethrough and has an enlarged fruit contacting head 52 at its lowermost end. The uppermost end of the rod 51 is adapted to be driven downwardly (by means fully disclosed in the aforementioned U.S. Pat. No. 3,030,990) once the fruit has been correctly positioned upon the fruit supporting apparatus 20 so that the prongs 48 of the transfer mechanism can be lifted upwardly out of the fruit while the fruit is held by the contacting head 52 which engages the fruit through a recess in the ring member 47. The fruit will then be properly positioned upon the fruit supporting apparatus which can then be indexed about the axis of the center post 28 to carry the fruit to the first of the fruit processing stations (not shown).

The fruit supporting apparatus 20 of the present invention (FIG. 2) will be seen to generally comprise a plurality of upright impaling prongs 60 which are arranged in a circle and which are adapted to receive the fruit F which is pushed downwardly thereon with the axis of the fruit generally extending parallel to the prongs and being located at the center of the area encompassed by the prongs. A fruit supporting platform 62 is slidably mounted upon the prongs by means of notches 63 (FIG. 3) cut into its outer circular periphery so that the platform will receive the lower central portion of the fruit as it moves downwardly on the prongs. The fruit supporting platform is affixed to the upper end of an elongated rod or spindle 64 by means of a screw 65, and the spindle is adapted to be moved vertically within a tubular fitting 66 that is threaded into the upper end of a cylinder 67 having a chamber 68 formed therein. It will be noted that the lower end of the spindle forms a piston operating within and closing the upper end of the chamber with the lower end of the spindle being provided with an enlarged flange 70 closely fitted within the bore of the chamber and being sealed thereto by means of an 0-ring 72 that is fastened by a screw 73 to the lowermost end of the spindle. The chamber is arranged to be filled with a hydraulic fluid, such as water, during the operation of the fruit supporting apparatus so as to control the movement of the piston and, therefore, the fruit supporting platform. The cylinder 67 is rigidly attached to the outermost end of the supporting arm 24 that carries the fruit supporting apparatus, and a tubular fitting 75 is inserted through the arm so as to provide communication between the enclosed chamber 68 and a fluid conduit or tube 77 lying parallel to the arm and extending inwardly toward the center post 28 of the fruit sectionizing machine.

The innermost end of tube 77, as shown at the left hand side of FIG. 2, is connected to an elbow fitting 78 which is threaded into a tubular extending portion 81 of a check valve adapter assembly 80 that is affixed atop an inner portion of the supporting arm 24. The adapter assembly is provided with a central passageway 82 which is in fluid communication with the chamber 68 through the fittings 78 and 75 and the connecting tube 77. The upper end of the passageway 82 is closed by a ball-type check valve structure 84. This check valve structure is conventional and includes a generally cylindrical body 85 threaded into the upper end of the adaptor assembly about the internal passageway in the assembly. A compression spring 86 is mounted axially within the body 85 to hold a ball 87 in a position so as to normally close an orifice 88 at the upper end of the check valve structure and prevent the egress of fluid therefrom. The ball is sealed about the periphery of the orifice by a conventional 0-ring 89.

In order to permit hydraulic fluid to be removed from the chamber 68 when the fruit supporting platform 62 is depressed, a hydraulic control means, as shown in FIG. 4 of the drawings, is provided. This control means includes an elongated tubular body member 90 which is provided with an outwardly extending flange 91 midway along its length which flange overlies and is securely bolted to the tool carrier plate 30 that is positioned above the fruit supporting apparatus. Both the upper and lower ends of the body member 90 are closed by bearings 93 which are secured within an axially extending passageway 92 of the body member by means of threaded bearing retainer caps 95. Extending axially through the bearings 93 and the passageway 92 of the body member is a vertical conduit 96 which is secured within the body member for relative vertical movement by means of a compression spring 97 which surrounds the conduit and acts against a flange 99 that is affixed to the conduit and rests upon the lower bearing 93. The lower end of the vertical conduit which extends below the body member 90 is threaded into a chuck assembly 98 which carries a vertically yieldable valve actuating member 100. The valve actuating member is adapted to engage the ball 87 in the check valve structure 84 to move it out of sealing engagement with the orifice 88 and thereby allow discharge of fluid from the passageway 82 in the adapter assembly 80 to the vertical conduit 96 of the hydraulic control means.

The chuck assembly 98 is best shown in FIG. 5 of the drawings wherein it is seen to include a generally cylindrical body member 102 which mounts a compression spring 103 within the bore 104 thereof which spring acts against the upper end of the valve actuating member 100 so as to force the lowermost elongated tip 105 of the actuating member into engagement with the ball 87 in the check valve structure 84. A cover 107 is threaded onto the lower end of the body member 102 and is adapted to retain, at the lower end of the body member, a ring-shaped gasket 108. The gasket is adapted to fit snugly within the surrounding cover and is provided with an axial passage extending therethrough. The gasket also is provided with an outwardly extending annular face 109 arranged to sealingly engage the upper, annular periphery of the check valve body 85 when the chuck assembly is lowered into engagement therewith so as to prevent the loss of fluid once the check valve is opened. The valve actuating member 100 will be seen to be provided with a plurality of longitudinally extending grooves 110 at its upper end which communicate with an enlarged bore 112 at the lower end of the body member 102 so that fluid will be transferred from the ball check valve structure, through the gasket 108, around the valve actuating member and along the bore 104, and into the vertical conduit 96. The valve actuating member is further provided with an annular flange 113 which is arranged to normally seal against the upwardly facing annular face 114 of the gasket to prevent loss of fluid from the conduit 96. As seen in FIG. 4, the upper end of the conduit is provided with a fitting 115 which permits the fluid therein to be directed either to an upright standpipe 117 or to a lateral discharge tube 118 through a restricted orifice (not shown).

In order to operate the fruit supporting apparatus of the present invention, the fruit F is first received upon the support platform 62 when it is in its uppermost position as shown in phantom lines in FIG. 2 of the drawings. In order to place the fruit upon the impaling prongs 60 of the fruit supporting apparatus whereby it can be lowered to the support platform, the overlying tool carrier plate 30 must first be lowered, as explained hereinbefore, and this lowering of the tool carrier plate will also lower the chuck assembly 98 that is depending therefrom so that it will be received in fluid-sealing engagement with the check valve structure 84 when the fruit is first received upon the support platform. This will permit the support platform to be lowered with the fruit since the fluid in the chamber 68 that is displaced by the projecting end of the spindle will be discharged through the connecting tube 77 and the adapter assembly 80 to the vertical conduit 96. The standpipe 117 is provided to aid in hydraulically balancing the weight of the fruit and the supporting spindle during the vertical positioning of the fruit and to permit rapid movement of the fruit while it is being positioned. As previously mentioned, the orifice leading to the discharge tube 118 is restricted and will result in a slow bleed off from the standpipe 117 during the time when the chuck assembly is out of engagement with the check valve structure 84.

Once the fruit supporting apparatus 20 is indexed and thereby moved laterally from the overlying chuck assembly 98, the check valve structure 84 will be maintained closed by the spring 86 so as to keep a fixed supply of fluid within the hydraulic system that comprises the adaptor assembly passageway 82, the tube 77, and the chamber 68 whereby the platform 62 will be maintained at the elevation at which it was set during the positioning of the fruit when the transfer mechanism 40 reaches its lowermost position, as shown, for example, in full lines in FIG. 2 of the drawings. The check valve structure will remain closed while the fruit supporting apparatus is indexed around the periphery of the sectionizing machine and while the various processing operations are carried out upon the fruit supported thereby. After the completion of the sectionizing operations and when the individual fruit segments have been discharged, the fruit supporting apparatus will be ready to be re-set with the support platform 62 being raised to its initial uppermost position (as shown in phantom lines in FIG. 2) so that it will be ready to receive a new fruit.

For this latter purpose, a second hydraulic control means is provided which includes a second chuck assembly 98 operable to engage and open the check valve structure 84 to permit fluid to be directed into the chamber 68. This second hydraulic control means, a portion of which is shown in FIG. 6, is precisely the same as that shown in FIG. 4 of the drawings with the exception that the upper end of the vertical conduit 96, rather than being connected to a fluid draining structure, is connected to an elbow fitting 120 which, in turn, is connected to a tube 122 that receives a continuous source of hydraulic fluid. The flange 113 on the valve actuating member 100 will normally seal against the upper face 114 of the gasket 108 to prevent this hydraulic fluid from being discharged from the chuck assembly; however, when the fruit supporting apparatus arrives beneath the chuck assembly, the lowering of the tool carrier plate 30 will lower the hydraulic control apparatus so that the chuck assembly thereof will open the check valve structure and allow fluid to be transferred through the tube 96 to recharge the chamber 68 and thereby force the fruit supporting platform 62 back into its uppermost position. Although the station at which this second hydraulic control apparatus is located is not shown in the drawings, it will be appreciated that it will be located just prior to the angular indexing of the fruit supporting apparatus to the fruit receiving position shown in FIG. 1.

With the fruit supporting apparatus of the present invention, it will be recognized that a highly dependable means of positioning a fruit at a predetermined elevation is obtained. Hydraulic circuitry is utilized to positively control the position of the fruit with the circuitry being activated only by overlying control mechanisms lying at particular locations on the path travelled by said fruit supporting apparatus which control mechanisms permit the discharge of fluid from the hydraulic circuitry at the appropriate time when the fruit is positioned on the supporting apparatus and which control mechanisms permit the flow of fluid into the hydraulic circuitry to re-set the supporting apparatus only after the fruit has been discharged therefrom.

Although the best mode contemplated for carrying out the present invention has been herein shown and described, it will be apparent that modification and variation may be made without departing from what is regarded to be the subject matter of the invention.

What is claimed is:

1. In a fruit processing machine which comprises means for supporting a fruit, a plurality of fruit processing elements positioned vertically above said fruit supporting means at spaced positions along a path, means for relatively moving said fruit supporting means and said fruit processing elements along said path so as to successively bring said fruit processing elements into positions above the fruit on said supporting means, and means for relatively vertically moving said fruit supporting means and said processing elements so as to cause said elements to operatively engage said fruit; the improvement comprising a fruit supporting apparatus forming a portion of said fruit supporting means and comprising a plurality of generally vertically extending impaling prongs arranged to receive a fruit thereon; a support member mounted for vertical movement relative to said prongs; a piston connected to said support member; a cylinder having an enclosed chamber arranged to receive one end of said piston in sealing engagement therewith; and hydraulic control means arranged to provide said chamber with hydraulic fluid to move said support member to an elevated position prior to the reception of a fruit thereon, to permit the controlled discharge of fluid from said chamber as said fruit is forced downwardly upon said support member, and to maintain said support member at a predetermined elevation.

2. In a fruit processing machine according to claim 1 wherein said hydraulic control means includes a check valve mounted so as to control the discharge from and the input of fluid to said chamber, means for supplying hydraulic fluid, means for discharging hydraulic fluid, and valve actuating members connected to said fluid supply means and to said fluid discharge means, each of said actuating members being movable relative to said check valve to open said check valve and permit communication between said chamber and the fluid supply or discharge means.

3. In a fruit processing machine according to claim 2 wherein each of said valve actuating members comprises a body having a passageway therethrough for communication with the associated fluid supply or discharge means, a contact member arranged to engage said check valve to open the same, and means yieldably mounting said contact member within said body so as to normally maintain said contact member in a position closing said passageway but permitting said contact member to be moved relative to said body when engaged by said check valve to permit communication between said passageway and said chamber through the opened check valve.

4. In a fruit processing machine according to claim 3 wherein each of said valve actuating members is provided with a resilient seal having an inwardly extending annular face and an outwardly extending annular face, said contact member having a flange arranged to normally seal against the inwardly extending face of each of said seals, and said check valve having an annular discharge orifice member adapted to seal against the outwardly extending face of each of said seals.

5. In a fruit processing machine according to claim 2 wherein said check valve is mounted in an upright position and whereby said valve actuating member connected to said fluid discharge means is arranged to be moved downwardly with said fruit when said fruit is delivered to said support member.

6. In a fruit processing machine according to claim 1 wherein said prongs are arranged in parallel relationship in a circle and said support member is slidably mounted upon said prongs so as to move vertically within the area encompassed by said prongs.

7. In a fruit processing machine which comprises an intermittently rotatable turret having a plurality of radially extending arms each adapted to support a fruit at the outer end thereof and a plurality of fruit processing elements positioned vertically above the turret at positions spaced circumferentially about said turret which elements are arranged to be reciprocated vertically into operative engagement with the fruit carried by said arms; the improvement comprising a fruit support platform located at the outer end of each of the arms, said platform being mounted for vertical movement with respect to its associated arm; a piston connected to and depending from said support platform; a cylinder having an enclosed chamber arranged to receive the lowermost end of said piston in sealing engagement therewith; and hydraulic control means arranged to provide said chamber with hydraulic fluid to move said support platform to an elevated position prior to the reception of a fruit thereon, to permit the controlled discharge of fluid from said chamber as said fruit is forced downwardly upon aid support platform, and to maintain said support platform at a predetermined elevation during the subsequent engagement of said fruit by said fruit processing elements.

8. In a fruit processing machine according to claim 7 wherein said hydraulic control means includes a check valve mounted so as to control the discharge from and the input of fluid to said chamber, means for supplying hydraulic fluid positioned above said turret at a first location, means for discharging hydraulic fluid positioned above said turret at a second location angularly spaced from said first location, and valve actuating members connected to said fluid supply means and to said fluid discharge means, each of said actuating members being movable relative to said check valve to open said check valve and successively permit communication between said chamber and the fluid supply means and between the chamber and the fluid discharge means as said support platform are indexed from said first location to said second location.

9. In a fruit processing machine according to claim 8 wherein each of said valve actuating members comprises a body having a passageway therethrough for communication with the associated fluid supply or discharge means, a contact member arranged to engage said check valve to open the same, and means yieldably mounting said contact member within said body so as to normally maintain said contact member in a position closing said passageway but permitting said contact member to be moved relative to said body when engaged by said check valve to permit communication between said passageway and said chamber through the opened check valve.

10. In a fruit processing machine according to claim 9 wherein each of said valve actuating member is provided with a resilient seal having an inwardly extending annular face and an outwardly extending annular face, said contact member having a flange arranged to normally seal against the inwardly extending face of each of said seal, and said check valve having an annular discharge orifice member adapted to seal against the outwardly extending face of each of said seal.

11. In a fruit processing machine according to claim 8 wherein each of said check valves are mounted in an upright position upon an inner portion of the associated arm and whereby said valve actuating member that is connected to said fluid discharge means is arranged to be moved downwardly with said fruit when said fruit is delivered to said support platform.

* * * * *